Figure 1:
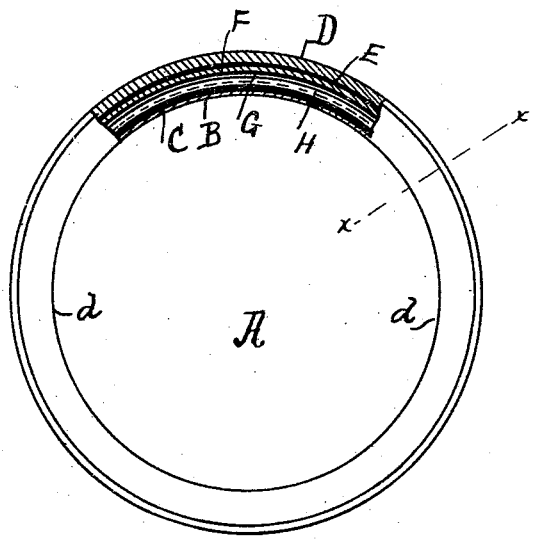

(No Model.)

W. T. KENNEDY.
PNEUMATIC TIRE.

No. 555,046.   Patented Feb. 18, 1896.

Witnesses:

M. McDonald
Edwin Eaton

INVENTOR

William T. Kennedy
by Thurman & Silvius.
Attorneys.

ANDREW B.GRAHAM. PHOTO-LITHO. WASHINGTON, D.C.

UNITED STATES PATENT OFFICE.

WILLIAM T. KENNEDY, OF INDIANAPOLIS, INDIANA.

PNEUMATIC TIRE.

SPECIFICATION forming part of Letters Patent No. 555,046, dated February 18, 1896.

Application filed July 29, 1895. Serial No. 557,462. (No model.)

*To all whom it may concern:*

Be it known that I, WILLIAM T. KENNEDY, a citizen of the United States, residing at Indianapolis, in the county of Marion and State of Indiana, have invented certain new and useful Improvements in Pneumatic Tires; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a protecting device for the tread of flexible pneumatic tires for bicycles and other vehicles; and it consists of a new and novel application of a flexible steel band, which will be more fully described hereinafter and pointed out in the claim.

My object is to provide a means whereby pneumatic tires may be used safely without danger of being punctured and thereby practically destroyed. In the present state of the art pneumatic tires are liable to great damage on account of broken glass or sharp pieces of metal in the roadways cutting through the rubber or other material of which tires are made, thereby allowing the compressed air to escape and destroying their usefulness. By the use of my invention this danger to the life of a tire is obviated. I have aimed to make my invention of few parts, simple in design, cheap in construction and durable in use.

I am aware that patents have been granted for pneumatic tires having metallic protecting-bands or coverings for the same purpose, but I disclaim them, and it is obvious to those skilled in the art that my invention is distinctive in construction, as will be disclosed in the drawings and description following.

Figure 4:
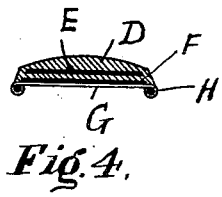
Figure 3:
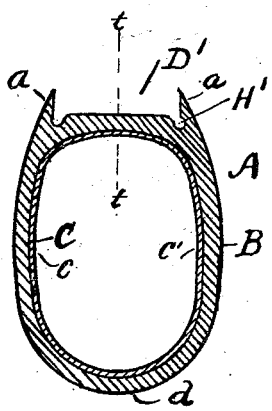
Figure 2:
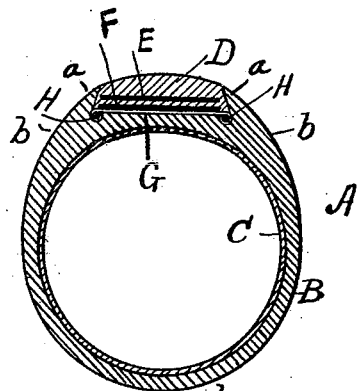

Referring to the drawings, Figure 1 represents a pneumatic tire as viewed from the side with a portion of the wall cut away disclosing an exaggerated section through the line $t\,t$ of Fig. 3. Fig. 2 is a cross-section through line $x\,x$ of Fig. 1, showing inflated tire with protecting-band and its outer flexible covering in position. Fig. 3 is a similar cross-sectional view of deflated tire, showing the channel for receiving the protecting-band; and Fig. 4 is a cross-section of protecting-band with its outer covering attached.

I make the outside B of the hollow tire A of rubber, with the canvas lining C in the usual manner, except that the wall of the outer side forming the tread $b\,D\,b$ is thickened and has a longitudinal channel D' around its whole outer circumference. The bottom of this channel is rectangular to the line $t\,t$. At each side of the channel are semicircular grooves H', which receive the beaded edges of the protecting metallic band. The band G is made of thin tempered steel or other suitable metal and the edges H are turned over a small wire, forming a rounded beaded edge for the purpose of preventing the cutting of the rubber by the otherwise thin edges of the band. A further purpose of the beads is to provide a pivotal point around which the annular jaws $a$ turn when clamping the band-cover.

The covering D is a continuous band made of rubber and preferably attached to the metallic band G by cement or other suitable means. To prevent undue stretching, I make the band D with the canvas strips E inserted in the band and the canvas strip F attached to the rubber on the inner side of the circle where it comes in contact with the metallic band. The inner circumference of the band D is somewhat less than that of the metallic band H.

In practical application of my invention the flexible band D is slightly stretched while being drawn over the metallic band, which it covers outside. The metallic band H having the covering D is then put into the channel or recess D' extending around the outside of the hollow tire while the tire is deflated and yielding, its flexibility permitting it to be readily compressed sufficiently to allow the band to pass over the rib or jaw $q$ on one side and drop into place in the channel, while the sides $c\,c'$ of the tire are flattened, thus opening the jaws $a\,a$ so that their inner faces stand open and perpendicularly to the bottom of channel. The complete tire A is then applied to a wheel in the usual manner, so that the inner circumference $d$ comes in contact with the wheel-rim, and the hollow tire is inflated. The compressed air fills the tube and forces it to assume its normal rounded shape and the ribs or jaws *a* turning over the beads H approach each other at their extremities, forming together clamps and a dovetail connection with the outer band covering the metallic band, and securely holding the same in position laterally, while the internal pressure of the air prevents the metallic band from slipping on its seat.

By the use of my device it is obvious that my object is attained and a reliable protection to the pneumatic tire provided, while avoiding the noise incident to a bare metallic tire.

Having described my invention, what I claim, and desire to secure by Letters Patent, is—

In a pneumatic tire having a continuous channel around its tread portion for reception of a shield and a shield therein having continuous beaded edges, the combination with the channel of the grooves H' at each side of said channel; the metallic band or shield G, having continuous wire along its edges held in place by the edges of said band being turned over it forming the bead H, said beading fitting into the said grooves at sides of channel; the outer covering D attached to said metallic band, said covering being composed of a continuous strip of canvas next to the metallic band, a strip of rubber next outside forming the tread and inclosing a strip of canvas, substantially as shown and described.

In testimony whereof I affix my signature in presence of two witnesses.

WILLIAM T. KENNEDY.

Witnesses:
L. C. THOMPSON,
M. MCDONALD.